(12) United States Patent
Taguchi et al.

(10) Patent No.: US 10,807,776 B2
(45) Date of Patent: Oct. 20, 2020

(54) RESIN FILM AND PROCESS FOR ITS PRODUCTION

(71) Applicant: AGC Inc., Chiyoda-ku (JP)

(72) Inventors: Daisuke Taguchi, Chiyoda-ku (JP); Wataru Kasai, Chiyoda-ku (JP); Yoshiaki Higuchi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 257 days.

(21) Appl. No.: 15/909,385

(22) Filed: Mar. 1, 2018

(65) Prior Publication Data

US 2018/0186914 A1 Jul. 5, 2018

Related U.S. Application Data

(63) Continuation of application No. PCT/JP2016/083279, filed on Nov. 9, 2016.

(30) Foreign Application Priority Data

Nov. 13, 2015 (JP) .................. 2015-222852

(51) Int. Cl.
*B65D 59/02* (2006.01)
*C08J 5/18* (2006.01)
(Continued)

(52) U.S. Cl.
CPC ......... *B65D 59/02* (2013.01); *B65D 39/0005* (2013.01); *C08F 210/02* (2013.01);
(Continued)

(58) Field of Classification Search
CPC ............ B65D 59/02; B65D 39/0005; B65D 2539/008; B65D 39/04; C08F 214/262;
(Continued)

(56) References Cited

U.S. PATENT DOCUMENTS 4,123,602 A * 10/1978 Ukihashi ............... C08F 210/02
522/185
2012/0148820 A1 6/2012 Okuya
2013/0316110 A1* 11/2013 Sudo .................. A61M 5/31511
428/36.8

FOREIGN PATENT DOCUMENTS

CN 103917347 7/2014
JP 60-251041 12/1985
(Continued)

OTHER PUBLICATIONS

US 9,234,058 B2, 01/2016, Qiu et al. (withdrawn)
International Search Report dated Jan. 17, 2017 in PCT/JP2016/083279, filed on Nov. 9, 2016.

*Primary Examiner* — James C Yager
(74) *Attorney, Agent, or Firm* — Oblon, McClelland, Maier & Neustadt, L.L.P.

(57) ABSTRACT

To provide a resin film which comprises an ethylene/tetrafluoroethylene copolymer and which is to be used as, for example, a rubber plug lamination film to prevent breakage at the time of producing a laminated rubber plug. The resin film comprises an ethylene/tetrafluoroethylene copolymer and is characterized in that the product of the value of the endothermic peak height ΔH (mW/mg) obtained by its DSC-analysis and the haze (%) measured at a thickness of 100 μm, is from 0.1 to 0.2 (mW/mg·%).

13 Claims, 2 Drawing Sheets

(51) Int. Cl.
    *B65D 39/00*      (2006.01)
    *C09D 123/08*      (2006.01)
    *C08F 214/26*      (2006.01)
    *C08F 210/02*      (2006.01)
    *C08L 23/08*      (2006.01)
    *C08L 27/18*      (2006.01)
    *G01N 25/48*      (2006.01)

(52) U.S. Cl.
    CPC ...... *C08F 214/262* (2013.01); *C08F 214/265* (2013.01); *C08J 5/18* (2013.01); *C08L 23/0892* (2013.01); *C08L 27/18* (2013.01); *C09D 123/0892* (2013.01); *B65D 2539/008* (2013.01); *C08F 2500/13* (2013.01); *C08F 2800/10* (2013.01); *C08J 2327/18* (2013.01); *C08L 2203/16* (2013.01); *G01N 25/4866* (2013.01); *Y10T 428/1352* (2015.01)

(58) Field of Classification Search
    CPC ............... C08F 210/02; C08F 214/265; C08F 2800/10; C08F 2500/13; C08F 214/26; C09D 123/0892; B29K 2023/08; C08J 5/18; C08J 2327/18; C08L 27/18; C08L 23/0893; C08L 2203/16; G01N 25/4866; B29D 99/0096; B29D 7/01; B29C 48/022; Y10T 428/1352
    See application file for complete search history.

(56) References Cited

FOREIGN PATENT DOCUMENTS

| | | |
|---|---|---|
| JP | 62-139668 | 6/1987 |
| JP | 2002-361667 | 12/2002 |
| JP | 2007-22068 | 2/2007 |
| JP | 2010-99939 | 5/2010 |
| JP | 2012-200931 | 10/2012 |
| WO | WO 99/38670 A1 | 8/1999 |
| WO | WO 2011/037034 A1 | 3/2011 |

\* cited by examiner

RESIN FILM AND PROCESS FOR ITS PRODUCTION

TECHNICAL FIELD

The present invention relates to a resin film and a process for its production.

BACKGROUND ART

As a rubber plug for sealing a container opening of a container to be used in applications for e.g. pharmaceuticals, a laminated rubber plug is known which is laminated with a fluororesin film. For example, in Patent Document 1, a laminated rubber plug is disclosed wherein as such a fluororesin film, a copolymer film made of tetrafluoroethylene, ethylene and a vinyl monomer having an fluoroalkyl group, is used.

PRIOR ART DOCUMENT

Patent Document

Patent Document 1: JP-A-60-251041

DISCLOSURE OF INVENTION

Technical Problem

However, by the conventional rubber plug lamination film made of a fluororesin, particularly in a case where the portion to be inserted to a container, of the rubber plug, has a complicated shape, there has been a case where it is difficult to sufficiently prevent formation of a defective product during the production of a laminated rubber plug, while maintaining the mechanical strength of the film.

An object of the present invention is to provide a resin film which comprises an ethylene/tetrafluoroethylene copolymer and which is to be used as e.g. a rubber plug lamination film to prevent breakage at the time of producing a laminated rubber plug.

Solution to Problem

The present invention provides a resin film and a process for its production, having the following constructions [1] to [15].

[1] A resin film comprising an ethylene/tetrafluoroethylene copolymer and characterized in that the product of the value of the endothermic peak height ΔH (mW/mg) obtained by its DSC-analysis, and the haze value (%) at a thickness of 100 μm, is from 0.1 to 0.2 (mW/mg·%).
[2] The resin film according to [1], wherein the endothermic peak height ΔH is at most 0.15 mW/mg, and the melting point is at least 200° C.
[3] The resin film according to [1] or [2], wherein the haze value at a thickness of 100 μm is at most 1.8%.
[4] The resin film according to any one of [1] to [3], wherein the tensile elongation at break in each of the MD direction and the TD direction at 180° C. is at least 850%.
[5] The resin film according to any one of [1] to [4], wherein in the ethylene/tetrafluoroethylene copolymer, the molar ratio of units derived from tetrafluoroethylene to units derived from ethylene is from 40/60 to 60/40.
[6] The resin film according to any one of [1] to [5], wherein the ethylene/tetrafluoroethylene copolymer contains units other than the units derived from ethylene and the tetrafluoroethylene units, and the content of such other units is from 3 to 8 mol %, to all units in the ethylene/tetrafluoroethylene copolymer.
[7] The resin film according to [6], wherein said units other than the units derived from ethylene and the tetrafluoroethylene units, are units derived from a fluorinated vinyl monomer represented by the following formula (1):

$$CH_2=CX-Rf \qquad (1)$$

wherein X is a hydrogen atom or a fluorine atom, and Rf is a fluoroalkyl group.
[8] The resin film according to any one of [1] to [7], which is used as a surface coating film for a laminated rubber plug.
[9] The resin film according to any one of [1] to [7], which is a film material for membrane facilities, a film material for agricultural horticultural houses, or a release film for the production of semiconductor devices or LED chips.
[10] A process for producing a resin film comprising a step of melt extrusion molding an ethylene/tetrafluoroethylene copolymer held in a hopper section in the presence of inert gas or under reduced pressure, at a molding temperature of at least 330° C., and characterized in that the product of the value of the endothermic peak height ΔH (mW/mg) obtained by its DSC-analysis, and the haze value (%) at a thickness of 100 μm, is from 0.1 to 0.2 (mW/mg·%).
[11] The process for producing a resin film according to [10], wherein the resin film has a tensile elongation at break of at least 850% in each of the MD direction and the TD direction at 180° C.
[12] The process for producing a resin film according to [10] or [11], wherein in the ethylene/tetrafluoroethylene copolymer, the molar ratio of units derived from tetrafluoroethylene to units derived from ethylene is from 40/60 to 60/40.
[13] The process for producing a resin film according to any one of [10] to [12], wherein the ethylene/tetrafluoroethylene copolymer contains units other than the units derived from ethylene and the units derived from tetrafluoroethylene, and the content of such other units is from 3 to 8 mol %, to all units in the ethylene/tetrafluoroethylene copolymer.
[14] A process for producing a laminated rubber plug, characterized by a step comprising press-heating a resin film as defined in any one of claims 1 to 8 and a rubber material containing a crosslinking agent, laminated on a cavity in a mold having a predetermined rubber plug shape, at a temperature of at least 150° C.
[15] A laminated rubber plug for sealing a container opening of a container, comprising a top plate portion having an outer diameter larger than an inner diameter of said container opening, and a leg portion in a cylindrical shape projecting from the lower surface to be in contact with the container opening, of the top plate portion, and forming a hollow interior space, and characterized in that the lower surface of the top plate portion and the leg portion are coated with a resin film as defined in any one of claims 1 to 8.

Advantageous Effects of Invention

According to the resin film of the present invention, breakage at the time of producing the laminated rubber plug is prevented.

According to the process for producing a resin film of the present invention, it is possible to obtain a resin film to be used as e.g. a rubber plug lamination film to prevent breakage at the time of producing a laminated rubber plug.

DESCRIPTION OF EMBODIMENTS

[Resin Film]

Figure 1:
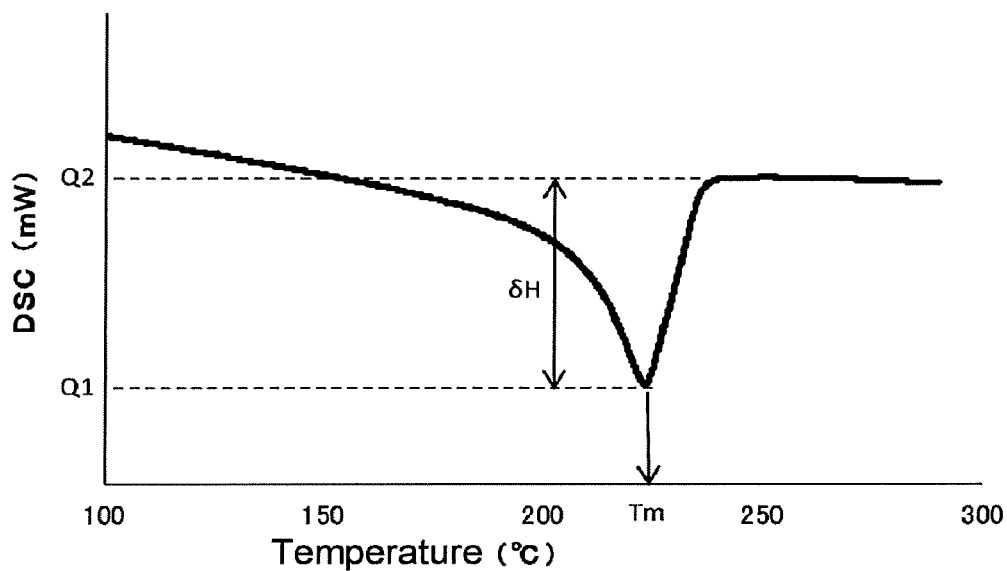
FIG. 1 is a diagram showing a method for measuring the endothermic peak height ΔH and the melting point by DSC-analysis.

The resin film of the present invention comprises an ethylene/tetrafluoroethylene copolymer (hereinafter referred to also as "ETFE"), wherein the product of the value of the endothermic peak height ΔH (mW/mg) obtained by its DSC-analysis and the haze value (%) at a thickness of 100 μm, is from 0.1 to 0.2 (mW/mg·%).

The resin film wherein the product of the value of the endothermic peak height ΔH (mW/mg) obtained by its DSC-analysis and the haze value (%) at a thickness of 100 μm, is from 0.1 to 0.2 (mW/mg-%), has large tensile elongations at break in both extrusion direction (MD direction) and width direction (TD direction) with a small difference between them, whereby it is excellent in isotropic stretchability. Thus, it is possible to prevent breakage of the resin film during the rubber plug lamination processing with the resin film.

(Ethylene/Tetrafluoroethylene Copolymer)

The ethylene/tetrafluoroethylene copolymer (ETFE) comprises at least units derived from ethylene (hereinafter referred to also as "E units") and units derived from tetrafluoroethylene (TFE) (hereinafter referred to also as "TFE units"). In ETFE, the molar ratio of TFE units to E units (hereinafter referred to also as "TFE/E ratio") is, from such a viewpoint that ETFE will have a high melting point, preferably from 40/60 to 60/40, particularly preferably from 45/55 to 56/44.

ETFE may contain, as the case requires, units (hereinafter referred to also as "third units") other than E units and TFE units.

A monomer (hereinafter referred to also as a "third monomer") to form the third units, may, for example, be a vinyl monomer having a fluoroalkyl group; a hydrocarbon olefin such as propylene, butene, etc.; a fluoroolefin having hydrogen atoms in an unsaturated group, such as vinylidene fluoride, vinyl fluoride, trifluoroethylene, etc.; a fluoroolefin (but excluding TFE) having no hydrogen atom in an unsaturated group, such as chlorotrifluoroethylene, etc.; a perfluoro(alkyl vinyl ether) such as perfluoro(propyl vinyl ether), etc.; a vinyl ether such as an alkyl vinyl ether, a (fluoroalkyl) vinyl ether, glycidyl vinyl ether, hydroxybutyl vinyl ether, methyl vinyloxy butyl carbonate, etc.; a vinyl ester such as vinyl acetate, vinyl chloroacetate, vinyl butanoate, vinyl pivalate, vinyl benzoate, vinyl crotonate, etc.; or a (meth) acrylic acid ester such as a (polyfluoroalkyl) acrylate, a (polyfluoroalkyl) methacrylate, etc. The third monomer is preferably a fluorinated vinyl monomer represented by the following formula (1), since ETFE will be thereby excellent in heat resistance, fuel barrier and stress cracking resistance.

$$CH_2=CX-Rf \quad (1)$$

In the formula, X represents a hydrogen atom or a fluorine atom, and Rf represents a fluoroalkyl group. In the fluorinated vinyl monomer represented by the formula (1), from the viewpoint of excellent polymerizability, X is preferably a hydrogen atom. Further, Rf is preferably a $C_{1-8}$ fluoroalkyl group, more preferably a $C_{1-8}$ perfluoroalkyl group, particularly preferably a $C_{2-6}$ perfluoroalkyl group. Rf may, for example, be a pentafluoroethyl group, a nonafluorobutyl group, a tridecafluorohexyl group, etc.

Hereinafter, $CH_2=CH(CF_2)_4F$ used in e.g. Examples will be referred to as "PFBE", and units derived from PFBE will be referred to also as "PFBE units".

In a case where ETFE contains third units, their content is preferably from 3 to 8 mol %, particularly preferably from 4 to 7 mol %, to all units in ETFE. When the content of the third units is at least the lower limit value in the above range, the tensile elongation at break under a high temperature condition becomes large, and when it is at most the upper limit value in the above range, the melting point becomes high.

The melting point of ETFE is, with a view to preventing adhesion of EFTF to a mold at a rubber plug molding temperature, is preferably at least 200° C., particularly preferably at least 205° C. The upper limit value of the melting point is, for example, at most 260° C., particularly preferably at most 250° C. The melting point of ETFE can be measured as the peak temperature of the endothermic curve measured by the DSC-analysis, which will be described later.

Q value of ETFE is, from such a viewpoint of that the tensile elongation at break becomes larger, preferably from 1 to 50, particularly preferably from 2 to 30. The Q value of ETFE is measured by using a flow tester under conditions of a cylinder area of 1 $cm^2$, a temperature of 297° C. and a load of 7 kg.

The content of ETFE in the resin film of the present invention is preferably at least 70 mass %, more preferably at least 85 mass %, particularly preferably 100 mass %. The resin film may contain a material other than ETFE within a range not to impair the performance. As a material other than ETFE, for example, polyvinylidene fluoride, nylon 6, nylon 12, etc. may be mentioned.

(Relation Between Endothermic Peak Height and Haze Value)

In the resin film of the present invention, the product of the value of the endothermic peak height ΔH (mW/mg) obtained by its DSC-analysis, and the haze value (%) at a thickness of 100 μm, is from 0.1 to 0.2 (mW/mg·%), preferably from 0.1 to 0.18 (mW/mg·%). When the product of the value of the endothermic peak height ΔH (mW/mg) and the haze value (%) at a thickness 100 μm, is at least the lower limit value in the above range, the crystallinity increases and, at the same time, the melting point increases, whereby the resin film will be excellent in tensile strength at break. When it is at most the upper limit value in the above range, the resin film will be excellent in tensile elongation at break. When it is within the above range, each of the tensile strength at break and the tensile elongation at break will be sufficient, and thus, it is possible to prevent breakage of the film during the production of a laminated rubber plug. Also at the time of using the resin film as a release film, breakage of the film can be prevented.

The DSC-analysis is conducted by heating 10 mg of a sample in a nitrogen atmosphere at a rate of 10° C. per minute, by means of a DSC-analyzer. From a differential thermal curve (DSC-curve) of the sample obtained by the DSC-analysis, the DSC-quantity (mW) at the endothermic peak is calculated, and it is divided by the mass of the sample, to obtain the endothermic peak height ΔH (mW/mg). Specifically, for example, in the DSC-curve shown in FIG. 1, a value obtained by dividing the difference δH (mW)

between the DSC-value Q1 (mW) at the endothermic peak appearing along with the temperature rise and the DSC-value Q2 (mW) at the shoulder appearing on the higher temperature side past the endothermic peak, by the mass of the sample used, is taken as the endothermic peak height ΔH (mW/mg). Further, the melting point of the sample is obtained as the temperature Tm which gives the endothermic peak.

In the resin film, the endothermic peak height ΔH (mW/mg) is preferably at most 0.15 mW/mg, particularly preferably at most 0.14 mW/mg. The endothermic peak height ΔH (mW/mg) is preferably at least 0.01 mW/mg, particularly preferably at least 0.02 mW/mg.

The haze value of the resin film is measured with respect to a test piece having a thickness of 100 μm by means of a haze meter, using a D light source as defined in JIS K7136.

The haze value at the thickness of 100 μm of the resin film is preferably at most 5%, more preferably at most 3%, particularly preferably at most 1.8%. When the haze value of the resin film is at most the upper limit value in the above range, clear visibility can be secured in the case of using the resin film as a film material for membrane facilities or as a film material for agricultural horticultural houses.

In the resin film, the endothermic peak height ΔH and the haze value are considered to reflect the crystalline state of ETFE constituting the resin film. It is considered that the lower the crystallinity of ETFE, the smaller the area of the endothermic peak in the DSC-analysis becomes, and accordingly, haze value tends to decrease. Further, it is considered that as the sizes of crystals of ETFE tend to be irregular, the endothermic peak becomes to have a sloping shape, and accordingly, the endothermic peak height ΔH tends to decrease. And, it is considered that, as the crystallinity of ETFE tends to be low, or as the sizes of the crystals tend to be uniform, the tensile elongation at break of the resin film tends to be large, and occurrence of a damage such as breakage during the production of a laminated rubber plug will be suppressed.

With respect to the endothermic peak height ΔH and the haze value in the resin film, it is preferred that ΔH is from 0.01 to 0.15 mW/mg, and the haze value is at most 1.8%, and it is particularly preferred that ΔH is from 0.02 to 0.14 mW/mg, and the haze value is at most 1.8%.

The crystalline state of ETFE varies depending upon the TFE/E ratio, the content of third units, the production conditions such as the cooling conditions, etc. during the film formation, and each of the endothermic peak height ΔH and the haze value is considered to vary with the same tendency. And, the present inventors have found that in ETFE having a high melting point (e.g. at least 200° C.), the endothermic peak height ΔH and the haze value have an unambiguous correlation with the tensile elongation at break.

Therefore, by appropriately selecting the TFE/E ratio, the content of third units, the production conditions such as cooling conditions, etc. during molding of the resin film, etc., it is possible to adjust so that the endothermic peak height ΔH and the haze value will satisfy the desired relationship. For example, when the TFE/E ratio is 60/40, the endothermic peak height ΔH and the haze value become the smallest, and if it deviates from such a ratio in either direction, the endothermic peak height ΔH and the haze value tend to become large. For example, with respect to the content of third units, as the content becomes larger, the endothermic peak height ΔH and the haze value tend to become smaller. For example, with respect to the production conditions, as ETFE in a molten state is more rapidly cooled, the endothermic peak height ΔH and the haze value tend to become smaller.

In addition to the foregoing, from the viewpoint of excellent durability at the temperature (e.g. at least 200° C.) during the production of a laminated rubber plug, the melting point of ETFE should better be high (e.g. at least 200° C.). By selecting the composition of ETFE, etc., while taking into account the correlation with the melting point, it is possible to let the endothermic peak height ΔH and the haze value satisfy the predetermined relationship. Here, the melting point of ETFE being high, is preferred also from such a viewpoint that the resin film can be used as a release film for the production of semiconductor devices or LED chips.

(Tensile Elongation at Break)

The tensile elongation at break in each of the MD direction and the TD direction at 180° C. of the resin film of the present invention is preferably at least 850%, particularly preferably at least 880%. The upper limit value for the tensile elongation at break is not particularly limited, but is preferably 1,200%, particularly preferably 1,100%. Further, the ratio (MD/TD) of the tensile elongation at break in the MD direction to the tensile elongation at break in the TD direction is preferably from 0.7 to 1.1, particularly preferably from 0.85 to 1.05.

The tensile elongation at break can be measured by using a universal tensile test device provided with a heating thermostat chamber.

The thickness of the resin film may be appropriately selected depending on the purpose, etc., and is preferably from 12 to 1,000 μm, particularly preferably from 20 to 650 μm. Particularly, in a case where the resin film is used for the production of a laminated rubber plug or as a release film, the thickness of the resin film is preferably from 12 to 250 μm, particularly preferably from 20 to 200 μm. In a case where the resin film is used as a film material for membrane structure facilities, or as a film material for agricultural horticultural houses, the thickness of the resin film is preferably from 25 to 1,000 μm, particularly preferably from 50 to 650 μm.

The resin film of the present invention has a large tensile elongation at break in a high temperature state and thus, can be suitably used for the production of a laminated rubber plug for sealing the container opening of a container. In particular, even if the shape of the portion to be inserted into the container is complex, film breakage at the time of lamination can be prevented.

Further, the resin film of the present invention has a small optical haze and thus can be suitably used as a film material for membrane structure facilities or as a film material for agricultural horticultural houses. When the resin film is used in such an application, clear visibility can be secured.

The resin film of the present invention has a large tensile elongation at break in a high temperature state and thus can be suitably used as a mold release film for the production of semiconductor devices or LED chips. Even in the case of performing sealing with an epoxy resin or a silicone resin especially by using a mold having a height or a complex shape, film breakage can be prevented.

[Process for Producing Resin Film]

The resin film of the present invention is preferably produced by a production process comprising a step of melt extrusion molding ETFE held in a hopper section in the presence of inert gas or under reduced pressure, preferably at a molding temperature of at least 330° C.

That is, the production process for the resin film of the present invention, is a process for producing a resin film comprising a step of melt extrusion molding ETFE held in a hopper section in the presence of inert gas or under reduced pressure, at a molding temperature of at least 330° C., and characterized in that the product of the value of the endothermic peak height ΔH (mW/mg) obtained by its DSC-analysis, and the haze value (%) at a thickness of 100 μm, is from 0.1 to 0.2 (mW/mg·%).

By conducting the extrusion molding at a high temperature while holding ETFE which is a resin material to be subjected to melt extrusion molding, in a hopper section (inlet for the material) in the presence of inert gas or under reduced pressure, it is possible to suppress the anisotropy in the resin film while maintaining the inherent physical properties of ETFE. This is considered to be because the oxidation pyrolysis of ETFE before the molding is suppressed.

The preferred embodiment of ETFE to be used in the production of the resin film is as described above.

The hopper section for holding ETFE is made to be either in an atmosphere containing an inert gas, or in a reduced pressure state. As the inert gas, e.g. a rare gas such as helium or argon, nitrogen, etc. may be mentioned. The content of the inert gas in the hopper section is preferably at least 60 vol %, particularly preferably at least 80 vol %. In the case of making the hopper section to be in a reduced pressure state, the reduced pressure is preferably at most 0.04 MPa, particularly preferably at most 0.02 MPa.

It is preferred that the atmosphere in the hopper section has a low oxygen content, and the oxygen content is preferably at most 8 vol %, particularly preferably at most 4 vol %.

The temperature in the hopper section is not particularly limited, but is preferably from 20 to 180° C., particularly preferably from 30 to 150° C.

ETFE held in the hopper section is formed into a resin film at an extrusion molding section heated to at least 300° C. The temperature at the extrusion molding section is at least 300° C., particularly preferably from 300 to 360° C. As the extrusion molding section, it is possible to use an extruder and a film forming die connected to the forward end of the extruder.

The resin film is preferably formed into a desired thickness by being rapidly cooled after the melt extrusion molding. By being rapidly cooled, it is possible to suppress crystal growth of ETFE. In the rapid cooling, the rate of temperature change in the region of the crystallization temperature±20° C. is preferably at least 5° C./sec., particularly preferably at least 10° C./sec. Adjustment of the cooling and thickness of the resin film may, for example, be made by contacting the resin film to a rotating metal roll disposed immediately below the film forming die and adjusted to a predetermined temperature.

[Process for Producing Laminated Rubber Plug]

The process for producing a laminated rubber plug of the present invention, comprises a step of heat-pressing the above-mentioned rubber plug lamination film and a rubber material containing a cross-linking agent, laminated on a cavity in a mold having a predetermined rubber plug shape, at a temperature of at least 150° C. By using the above-mentioned rubber plug lamination film, it is possible to prevent breakage of the film during the production of a laminated rubber plug and to produce the laminated rubber plug with excellent productivity.

Figure 2:
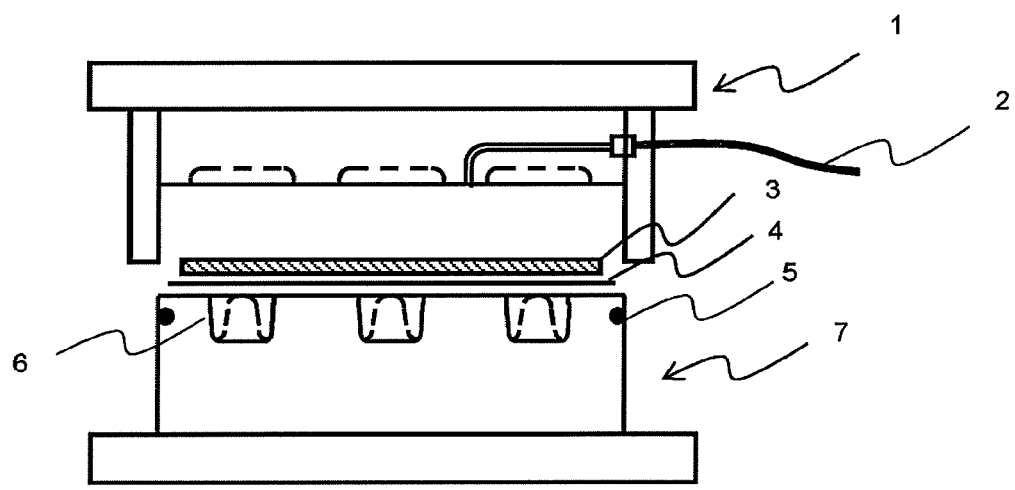
FIG. 2 is a schematic cross-sectional view showing an example of a process for producing a laminated rubber plug according to the present embodiment.

The process for producing a laminated rubber plug will be described with reference to the drawings. FIG. 2 is a schematic cross-sectional view showing an example of the process for producing laminated rubber plugs. As shown in FIG. 2, on a lower mold 7 having a plurality of cavities 6 having a predetermined rubber plug shape, a rubber plug lamination film 4 of the present embodiment, a rubber material 3 containing a crosslinking agent, and an upper mold 1 to form top plate portions of respective laminated rubber plugs, are laminated in this order, and while heating the lower mold 7 and the upper mold 1, they are pressed in the lamination direction to produce laminated rubber plugs. By the press-heating of the lower mold 7 and the upper mold 1, the rubber plug lamination film 4 and the rubber material 3 are pressed into the cavities 6, and at the same time, crosslinking of the rubber material 3 progresses, whereby laminated rubber plugs having a predetermined shape and laminated with the rubber plug lamination film 4, are produced.

In FIG. 2, the upper mold 1 is provided with an in-mold vacuum line 2, and the lower mold 7 is provided with an O-ring 5 for maintaining vacuum on its side. By reducing the pressure in the mold by the in-mold vacuum line 2 in such an airtight state that the vacuum maintaining O-ring 5 provided on the side surface of the lower mold 7 and the upper mold 1 are in contact with each other, the cavities 6 are vacuumed, and the rubber plug lamination film 4 and the rubber material 3 are injected along the shapes of the cavities 6.

In FIG. 2, three cavities 6 are disposed in a direction perpendicular to the lamination direction, but further, three cavities 6 may be disposed also on the verso side.

The rubber material includes a non-crosslinked or low-crosslinked rubber. The rubber may, for example, be butyl rubber, natural rubber, SBR, CR, NBR, EPDM, etc.

The crosslinking agent may, for example, be sulfur; quinone oxime; or an organic peroxide such as a dialkyl peroxide, 1,1-di(tert-butylperoxy)-3,3,5-trimethylcyclohexane, 2,5-dimethylhexane-2,5-dihydroxy peroxide, benzoyl peroxide, tert-butylperoxy benzene, 2,5-dimethyl-2,5-di(benzoyl peroxy) hexane, tert-butylperoxy maleic acid, tert-butylperoxyisopropyl carbonate, etc. Among them, a dialkyl peroxide is preferred.

The dialkyl peroxide may, for example, be di-tert-butyl peroxide, tert-butyl cumyl peroxide, dicumyl peroxide, α,α-bis(tert-butylperoxy)-p-diisopropylbenzene, 2,5-dimethyl-2,5-di(tert-butylperoxy) hexane, 2,5-dimethyl-2,5-di(tert-butylperoxy)-3-hexyne, etc. The content of the crosslinking agent in the rubber material is preferably from 0.05 to 10 mass %, particularly preferably from 0.1 to 5 mass %.

The amount of the rubber material to be placed on the mold cavities is, for example, the volume amount of from 0.95 to 1.3 times, relative to the volume of the cavities. Further, the thickness of the rubber plug lamination film to be placed on the mold cavities may, for example, be from 12 to 250 μm.

The heating temperature of the mold at the time of the production of laminated rubber plugs is preferably at least 150° C., particularly preferably from 160 to 200° C. The molding pressure is preferably at least 0.05 MPa, particularly preferably from 0.1 to 40 MPa. Inside of the mold formed by the upper mold and the lower mold is preferably depressurized, and at most 0.4 MPa is preferred, and from 0 to 0.2 MPa is particularly preferred. The molding time for the laminated rubber plugs is preferably from 0.5 to 10 minutes, particularly preferably from 1 to 7 minutes.

[Laminated Rubber Plug]

The laminated rubber plug of the present invention is a laminated rubber plug for sealing a container opening of a container, and comprises a top plate portion having an outer diameter larger than an inner diameter of said container opening, and a leg portion in a cylindrical shape projecting from the lower surface to be in contact with the container opening, of the top plate portion, and forming a hollow interior space, and the lower surface of the top plate portion and the leg portion are coated with the above-mentioned resin film.

Applications of the container to which the laminated rubber plug is to be applied, may be vials for medical chemicals, vials for storage of specimens, storage bottles for chemicals, solvents, etc. The material for the container may, for example, be glass, a resin such as polystyrene, polypropylene, acrylic resin or fluororesin, etc.

Figure 3:
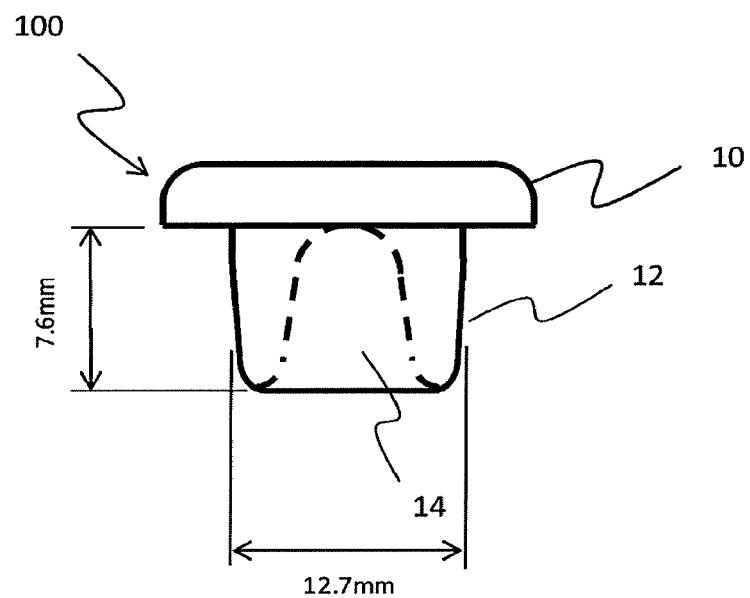
FIG. 3 is a schematic cross-sectional view showing an example of a laminated rubber plug according to the present embodiment.

An example of a laminated rubber plug will be described with reference to the drawings. As shown in FIG. 3, the shape of a laminated rubber plug 100 may, for example, has a top plate portion 10 having an outer diameter larger than the inner diameter of a container opening, and a leg portion 12 in a cylindrical shape projecting from the lower surface to be in contact with the container opening, of the top plate portion, and partitioning and forming a hollow interior space 14. The lower surface of the top plate portion and the leg portion are stretch-coated with the resin film.

The outer diameter of the top plate portion 10 may simply be larger than the inner diameter of the container opening, and, for example, it may be from 1.1 to 3 times to the inner diameter of the container opening. The thickness of the top plate portion 10 is not particularly limited.

The cylindrical shape of the leg portion 12 may be a shape having a constant outer diameter, or may be a shape in which the outer diameter changes continuously from the top plate portion towards the forward end of the leg portion. The shape of the interior space partitioned and formed by the leg portion 12 may be cylindrical with a constant diameter, or a shape in which the diameter changes continuously.

Of the leg portion 12, the length of the cylindrical shape and the outer and inner diameters of the cylindrical shape may suitably be selected depending on the shape, purpose, etc. of the container to be used. When using a glass vial as the container, the length of the leg portion 12 is 7.2 mm in one embodiment, but, for example, it may be from 2 to 25 mm. The outer diameter is 14.5 mm in one embodiment, but, for example, it may be from 8 to 30 mm. The inner diameter corresponds to the outer diameter of the internal space, and is, for example, from 4 to 25 mm. Further, the ratio of the outer diameter to the length of the leg portion is, for example, from 0.3 to 15, and the ratio of the inner diameter to the outer diameter is, for example, from 0.15 to 0.8.

Figure 4:
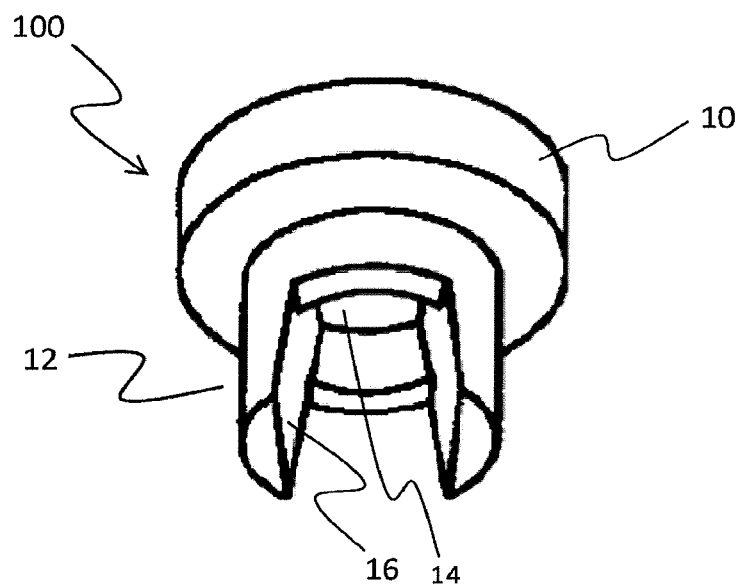
FIG. 4 is a schematic perspective view showing another example of a laminated rubber plug according to the present embodiment.

Another example of the shape of the laminated rubber plug 100 has, for example, as shown in FIG. 4, a top plate portion 10 having an outer diameter larger than the inner diameter of the container opening, and a leg portion 12 in a cylindrical shape projecting from the lower surface to be in contact with the container opening, of the top plate portion, and partitioning and forming a hollow inner space 14, wherein the distal end of the leg portion is divided into at least two longitudinal portions 16 by at least two notches in the longitudinal direction. The lower surface of the top plate portion and the leg portion are stretch-coated with the resin film.

In FIG. 4, the number of notches are two, but three or more notches may be provided so that the end of the leg portion may be divided into three or more portions. The length of a notch in the widthwise direction perpendicular to the longitudinal direction may, for example, be from 10 to 80% of the circumferential length of the leg portion. The longitudinal length of a notch may be from 15 to 100% of the length of the leg portion.

EXAMPLES

Now, the present invention will be described in detail with reference to Examples, but the present invention is not limited to these Examples. Among the following Ex. 1 to 7, Ex. 1 is Example of the present invention, and Ex. 2 to 7 are Comparative Examples.

The respective measurement methods in Examples are as follows.

[Evaluation Methods]
(Evaluation of Lamination Properties)

On the lower surface of the top plate portion 10 and the leg portion 12 of the rubber plug having the shape as shown in FIG. 3, ETFE obtained in each Ex. was laminated. The rubber used was peroxide vulcanizing type butyl rubber. The ETFE film was placed on cavities 6 of the lower mold 7 shown in FIG. 2, and thereon, a plate of the unvulcanized butyl rubber containing a peroxide vulcanizing agent weighed 1.1 times the cavity volume was placed and laminated, whereupon the upper mold 1 was set. These molds were preheated to be substantially the same as the heating platen temperature between hot press plates to be used later. Then, the mold was moved to between the upper and lower press plates of the hot press and inside of the cavities was degassed to at most 0.01 MPa, followed by pressing so that rubber plugs were molded and at the same time, they were laminated with ETFE. The hot pressing conditions were set to be such that the hot platen set temperature was 180° C., the pressing pressure was 15 tons, and the holding time was 5 minutes. Then, the hot pressing was depressurized and opened to take out the mold.

The rubber plugs laminated with the ETFE film were taken out from the mold, and using a loupe and optical microscopy, the presence or absence of breakage of the ETFE film was observed with respect to the 12 rubber plugs. The ratio of film breakage occurred was obtained and shown in Table 1. In Table 1, the number of broken rubber plugs/total number of rubber plugs (12) is disclosed.

(Measurements of Melting Point and $\Delta H$ of ETFE Film)

A differential scanning calorimeter (manufactured by Seiko Instruments Inc. differential scanning calorimeter, model DSC7030) was used. The ETFE film obtained in each Ex. was slit into a width 3 mm and cut in a length so as to become 10±2 mg, whereupon the obtained sample was folded and placed in an aluminum pan, and after an aluminum lid was placed from the top, these were pressurized and caulked to obtain a measurement sample. On the other hand, as a comparative sample, one obtained by placing the aluminum lid on the empty aluminum pan, followed by caulking, was used.

While maintaining a nitrogen atmosphere by letting dry nitrogen gas flow at a flow rate of 50 mL/min., heating was conducted at a heating rate of 10° C./min. to obtain a DSC-curve. By reading the temperature of the prominent endothermic peak appearing in a temperature region exceeding 100° C., it was taken as the melting point of the film. Further, as shown in FIG. 3, by reading the difference between the DSC-value Q1 (mW) of the endothermic peak and the DSC-value Q2 (mW) at the shoulder position on the high temperature side of the peak, as an absolute value, and by dividing it by the mass (mg) of the ETFE film, the endothermic peak height $\Delta H$ (mW/mg) was obtained.

The melting point and ΔH of the ETFE film are shown in Table 1.

(Film Thickness)

The average value measured at five points by means of a digital micrometer (manufactured by Precision Technology Inc., Ltd., Model M-30) was taken as the thickness of the film.

(Haze Value)

The haze value was measured by means of a haze meter (manufactured by Nippon Denshoku Industries Co., Ltd. Model NDH-5000) using the D light source as defined in JIS K7136. Here, a haze value of an ETFE film with a thickness of from 90 to 110 μm was regarded as a haze value of an ETFE film having a thickness of 100 μm. The haze value (%) is shown in Table 1.

(Tensile Elongation at Break)

Using a universal tensile testing apparatus (manufactured by Orientec Co., Ltd. Model RTC-1310A) provided with a heated thermostatic chamber, the temperature of the thermostatic chamber was set so that the temperature near a test piece became 180° C. The ETFE film obtained in each Ex. was punched out to obtain a test piece by means of a dumbbell cutter of ASTM D638 TypeV shape. By attaching a marker that was set to score 7.62 mm at the center of the test piece, and by tracking with a video system from the outside of the window provided on the thermostatic chamber, the tensile elongation at break at a high temperature was measured in each of the MD direction and the TD direction. The tensile speed was 50 mm/min. The tensile elongation at break (%) is shown in Table 1.

(Melting Point of ETFE)

The melting point of ETFE was measured by a DSC-analyzer in the same manner as described above, except that instead of the ETFE film, a powdered ETFE before film formation was used, and the ETFE was put in the aluminum pan so as to be a mass of 10±2 mg.

(Q Value of ETFE)

With respect to ETFE before film formation, by means of Flow Tester CFT-100D manufactured by Shimadzu Corporation, the extrusion rate was obtained at the time of extruding the ETFE into an orifice having a diameter of 2.1 mm and a length of 8 mm with a cylinder area of 1 cm$^2$ at a temperature of 297° C. under a load of 7 kg (68.6N), and the obtained value was taken as the Q value (mm$^3$/sec).

Ex. 1

A jacketed stainless steel polymerization vessel having an internal volume of 430 L was degassed; 438 kg of 1-hydrotridecafluorohexane, 807 g of methanol and 8.5 kg of PFBE were charged; and TFE and ethylene were injected in a ratio of 84/16 (molar ratio) to 1.5 MPaG. Inside of the polymerization vessel was heated to 66° C., and as a radical polymerization initiator, 1.73 L of a 1-hydrotridecafluorohexane solution containing 2 mass % of tert-butyl peroxypivalate was charged to initiate polymerization. During the polymerization, a mixed gas of TFE/ethylene=54/46 (molar ratio) was continuously charged so that the pressure became constant, and PFBE was continuously charged so that it would be 5 mol % to the mixed gas. After 197 minutes from the initiation of polymerization, at the time when 34.7 kg of the mixed gas was charged, inside of the polymerization vessel was lowered to room temperature and at the same time, purged to normal pressure.

The obtained slurry was transferred to a 850 L granulating vessel; 340 L of water was added; and the solvent was removed under heating to obtain 37 kg of ETFE1.

The composition of ETFE1 was TFE units/E units/PFBE derived units=51.3/43.6/5.1 (molar ratio); the melting point was 229° C.; and Q value was 5.4.

The obtained ETFE1 was extruded into a strand with an outer diameter of 2.5±0.5 mm by means of a co-rotating twin screw extruder (manufactured by TECHNOVEL CORPORATION) having a segmented screw with an outer diameter of 32 mm and a length of 1,445 mm, at a screw rotational speed of 75 rpm at a temperature of 280° C. and at an extrusion rate of 30 kg/hr, then cooled with water and thereafter cut in a length of from 2 to 3 mm using a pelletizer to obtain pellets. Here, rpm indicates the revolutions per minute.

The pellets of ETFE1 were formed into a film, by attaching a film-forming die set to have a width of 700 mm and a gap of the discharge port being 0.4 mm, to the forward end of a single screw extruder having a screw with an outer diameter of 65 mm and a length of 1,950 mm. At the material inlet of the extruder, a vacuum hopper (manufactured by MATSUBO Corporation) was attached and inside of the vacuum hopper was maintained to be at most 0.05 MPa. The temperature of the forward end of the extruder and the film forming die was set to be 340° C., and ETFE1 was extruded from the film die at an extrusion rate of 37 kg/hr. The surface speed of a metal roll disposed immediately below the film die and set at a surface temperature of 165° C., was adjusted to be 5 m/min., and by molding the extruded film along this roll, a resin film having a thickness of 102 μm was obtained.

Ex. 2

34.7 kg of ETFE2 was obtained by conducting polymerization and post treatment in the same manner as in Ex. 1, except that the charged amounts of the raw materials were changed to 446 kg of 1-hydrotridecafluorohexane, 1.73 kg of methanol and 5.05 kg of PFBE, respectively; the initial charge of TFE and ethylene was injected by changing their molar ratio to 89/11; the radical polymerization initiator was changed to 1.79 L of a 1-hydrotridecafluorohexane solution containing 2 mass % of diisopropylperoxydicarbonate; the mixed gas during the polymerization was changed to TFE/ethylene=60/40 (molar ratio); PFBE was continuously charged so that it would be 3.3 mol % to the gas mixture; and the time until the purge was changed to 278 minutes from the initiation of the polymerization.

The composition of ETFE2 was TFE units/E units/PFBE units=55.9/40.7/3.3 (molar ratio), the melting point was 234° C., and Q value was 19.1.

A resin film was obtained in the same manner as in Ex. 1 except that instead of ETFE1, ETFE2 was used.

Ex. 3

35.4 kg of ETFE3 was obtained by conducting polymerization and post treatment in the same manner as in Ex. 1, except that the charged amounts of the raw materials were changed to 439 kg of 1-hydrotridecafluorohexane, 357 g of methanol and 13.6 kg of PFBE, respectively; the radical polymerization initiator was changed to 2.94 L of a 1-hydrotridecafluorohexane solution containing 2 mass % of tert-butyl peroxypivalate; PFBE was continuously charged so that it would be 8.5 mol % to the gas mixture supplied during the polymerization; and the time until the purge was changed to 206 minutes from the initiation of the polymerization.

The composition of ETFE3 was TFE units/E units/PFBE units=49.7/42.0/8.3 (molar ratio), the melting point was 195° C., and Q value was 6.3.

A resin film was obtained in the same manner as in Ex. 1 except that instead of ETFE1, ETFE3 was used.

Ex. 4

Using ETFE1 obtained in Ex. 1, a resin film was obtained in the same manner as in Ex. 1 except that the vacuum in the hopper was released to bring the atmosphere to an air atmosphere of normal pressure, and the temperature of the forward end of the extruder and the film-forming die was adjusted to 300° C.

Ex. 5

Using ETFE1 obtained in Ex. 1, a resin film was obtained in the same manner as in Ex. 1 except that the vacuum in the hopper was released to bring the atmosphere to an air atmosphere of normal pressure.

R-225cb as a chain transfer agent and 3.42 kg of PFBE; the radical polymerization initiator was changed to 3.8 L of a 1-hydrotridecafluorohexane solution containing 1 mass % of diisopropylperoxydicarbonate; PFBE was continuously charged so that it would be 2.1 mol % to the gas mixture supplied during the polymerization; the time until the purge was changed to 181 minutes from the initiation of the polymerization; and the charged amount of the mixed gas was changed to 33 kg.

The composition of ETFE5 was TFE units/E units/PFBE units=52.9/45.0/2.1 (molar ratio), the melting point was 257° C., and Q value was 8.0.

A resin film was obtained in the same manner as in Ex. 1 except that instead of ETFE1, ETFE5 was used.

TABLE 1

| | ETFE | | | | Evaluation results of resin film | | | | | |
|---|---|---|---|---|---|---|---|---|---|---|
| | | | | | 180° C. tensile | | | | | |
| Ex. | Type | TFE/E ratio (mol ratio) | Content of PFBE units (mol %) | Yes or No of use of vacuum hopper | Molding temperature (° C.) | elongation at break (%) MD/TD | Ratio of film breakage | Melting point (° C.) | $\Delta H$ (mW/mg) | Haze @100 μm (%) | $\Delta H \times$ haze (mW/mg·%) |
| 1 | ETFE1 | 54/46 | 5.0 | Yes | 340 | 890/910 | 0/12 | 229 | 0.120 | 1.41 | 0.17 |
| 2 | ETFE2 | 60/40 | 3.3 | Yes | 340 | 780/760 | 2/12 | 234 | 0.155 | 2.58 | 0.40 |
| 3 | ETFE3 | 54/46 | 8.3 | Yes | 340 | 640/680 | 5/12 | 195 | 0.087 | 0.92 | 0.08 |
| 4 | ETFE1 | 54/46 | 5.0 | No | 340 | 730/930 | 1/12 | 229 | 0.120 | 1.97 | 0.24 |
| 5 | ETFE1 | 54/46 | 5.0 | No | 340 | 810/820 | 1/12 | 229 | 0.120 | 2.16 | 0.26 |
| 6 | ETFE4 | 65/35 | 2.1 | Yes | 340 | 760/810 | 1/12 | 225 | 0.240 | 1.36 | 0.33 |
| 7 | ETFE5 | 54/46 | 2.1 | Yes | 340 | 650/710 | 4/12 | 257 | 0.480 | 3.76 | 1.80 |

Ex. 6

26.5 kg of ETFE4 was obtained by conducting polymerization and post treatment in the same manner as in Ex. 1, except that the charge of the raw materials was changed to 294.1 kg of 1-hydrotridecafluorohexane, 144.8 kg of R-225cb (manufactured by Asahi Glass Company, Limited AK225cb) as a chain transfer agent and 1.96 kg of PFBE; the initial charge of TFE and ethylene was injected by changing their molar ratio to 97/3; the radical polymerization initiator was changed to 950 mL of a 1-hydrotridecafluorohexane solution containing 0.5 mass % of diisopropylperoxydicarbonate; the mixed gas supplied during the polymerization was changed to TFE/ethylene=65/35 (molar ratio); PFBE was continuously charged so that it would be 2.1 mol % to the gas mixture; the time until the purge was changed to 178 minutes from the initiation of the polymerization; and the charged amount of the mixed gas was changed to 80 g.

The composition of ETFE4 was TFE units/E units/PFBE units=63.7/34.2/2.1 (molar ratio), the melting point was 225° C., and Q value was 8.2.

A resin film was obtained in the same manner as in Ex. 1 except that instead of ETFE1, ETFE4 was used.

Ex. 7

34.7 kg of ETFE5 was obtained by conducting polymerization and post treatment in the same manner as in Ex. 1, except that the charge of the raw materials was changed to 335.7 kg of 1-hydrotridecafluorohexane, 101.4 kg of In the laminated rubber plug which was laminated with the resin film in Ex. 1 wherein the product of $\Delta H$ and the haze value was 0.17 (mW/mg·%), there was no occurrence of breakage of the film.

On the other hand, in the laminated rubber plug which was laminated with a resin film in each of Ex. 2 to 7 wherein the product of $\Delta H$ and the haze value was less than 0.1 (mW/mg·%) or more than 0.2 (mW/mg·%), breakage of the film occurred.

In Ex. 4, ETFE1 was used as in Ex. 1, but since it was molded without using a vacuum hopper and yet at 300° C., the product of $\Delta H$ and the haze value was more than 0.2 (mW/mg·%). In Ex. 5, ETFE1 was used as in Ex. 1, but since no vacuum hopper was used, the product of $\Delta H$ and the haze value was more than 0.2 (mW/mg·%).

INDUSTRIAL APPLICABILITY

According to the present invention, it is possible to obtain a resin film with a tensile elongation at break being large in a high temperature state. The resin film of the present invention is useful for a laminated rubber plug, as a film material for membrane structure facilities, as a film material for agricultural horticultural houses, or as a release film for the production of semiconductor devices or LED chips.

This application is a continuation of PCT Application No. PCT/JP2016/083279, filed on Nov. 9, 2016, which is based upon and claims the benefit of priority from Japanese Patent Application No. 2015-222852 filed on Nov. 13, 2015. The contents of those applications are incorporated herein by reference in their entireties.

REFERENCE SYMBOLS

1: upper mold, 2: in-mold vacuum line, 3: rubber material, 4: resin film, 5: O-ring for maintaining vacuum, 6: cavity, 7: lower mold, 10: top plate portion, 12: leg portion

What is claimed is:

1. A resin film comprising a polymer comprising tetrafluoroethylene (TFE), ethylene (E), and $CH_2=CH(CF_2)_4F$ (PFBE), wherein a content of PFBE is from 4 to 7 mol % with respect to all units in the polymer, and
   wherein the product of the value of the endothermic peak height ΔH (mW/mg) obtained by its DSC-analysis, and the haze value (%) at a thickness of 100 μm, is from 0.1 to 0.2 (mW/mg·%).

2. The resin film according to claim 1, wherein the endothermic peak height ΔH is at most 0.15 mW/mg, and the melting point is at least 200° C.

3. The resin film according to claim 1, wherein the haze value at a thickness of 100 μm is at most 1.8%.

4. The resin film according to claim 1, wherein the tensile elongation at break in each of the MD direction and the TD direction at 180° C. is at least 850%.

5. The resin film according to claim 1, wherein in the polymer, the molar ratio of units derived from tetrafluoroethylene to units derived from ethylene is from 40/60 to 60/40.

6. The resin film according to claim 1, which is used as a surface coating film for a laminated rubber plug.

7. The resin film according to claim 1, which is a film material for membrane structure facilities, a film material for agricultural horticultural houses, or a release film for the production of semiconductor devices or LED chips.

8. A process for producing a resin film according to claim 1, comprising:
   melt extrusion molding the polymer comprising tetrafluoroethylene (TFE), ethylene (E), and $CH_2=CH(CF_2)_4F$ (PFBE) held in a hopper section in the presence of inert gas or under reduced pressure, at a molding temperature of at least 330° C.,
   wherein a content of PFBE is from 4 to 7 mol % with respect to all units in the polymer, and
   wherein the product of the value of the endothermic peak height ΔH (mW/mg) obtained by its DSC-analysis, and the haze value (%) at a thickness of 100 μm, is from 0.1 to 0.2 (mW/mg·%).

9. The process for producing a resin film according to claim 8, wherein the resin film has a tensile elongation at break of at least 850% in each of the MD direction and the TD direction at 180° C.

10. The process for producing a resin film according to claim 8, wherein in the polymer, the molar ratio of units derived from tetrafluoroethylene to units derived from ethylene is from 40/60 to 60/40.

11. A process for producing a laminated rubber plug, comprising:
   press-heating a resin film according to claim 1 and a rubber material comprising a crosslinking agent, laminated on a cavity in a mold having a predetermined rubber plug shape, at a temperature of at least 150° C.

12. A laminated rubber plug for sealing a container opening of a container, comprising a top plate portion having an outer diameter larger than an inner diameter of said container opening, and a leg portion in a cylindrical shape projecting from a lower surface of the top plate portion, to be in contact with the container opening, and forming a hollow interior space, and characterized in that the lower surface of the top plate portion and the leg portion are coated with a resin film according to claim 1.

13. The resin film according to claim 1, wherein a melting point of the polymer is from 200 to 250° C.

* * * * *